T. Chutaux.
Electric Battery.

N° 105,042. Patented Jul. 5, 1870.

Witnesses

Inventor
T. Chutaux

United States Patent Office.

THÉOPHILE CHUTAUX, OF PARIS, FRANCE.

Letters Patent No. 105,042, dated July 5, 1870.

IMPROVEMENT IN ELECTRIC BATTERIES.

The Schedule referred to in these Letters Patent and making part of the same.

To all whom it may concern:

Be it known that I, THÉOPHILE CHUTAUX, of Paris, in the Empire of France, have invented a new and useful Improvement in Electric Batteries; and I do hereby declare the following to be a full, clear, and exact description thereof, which will enable those skilled in the art to make and use the same, reference being had to the accompanying drawing forming part of this specification, in which drawing—

Figure 1:
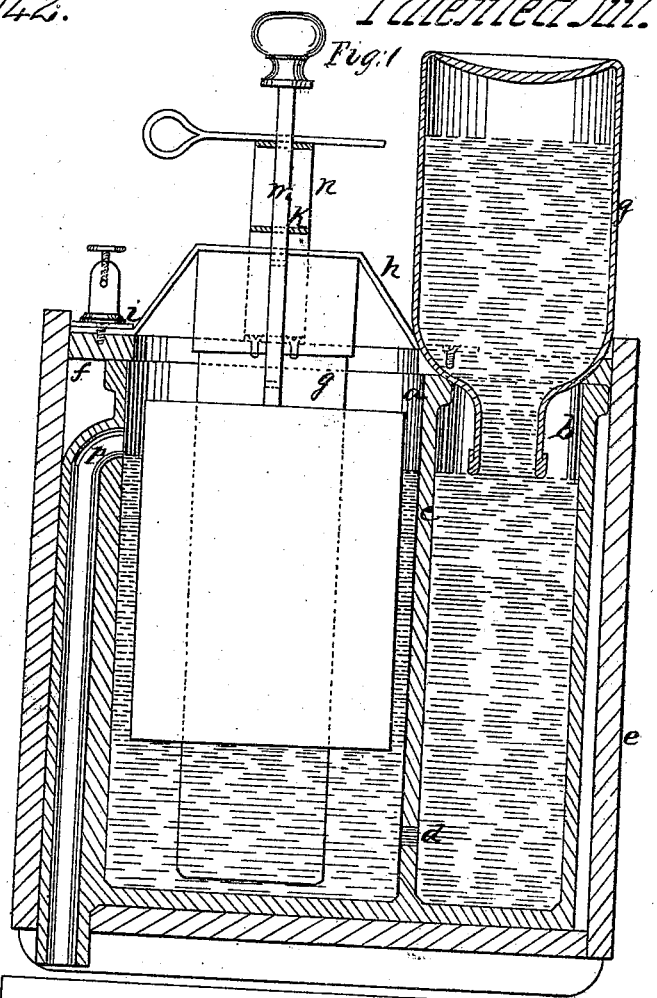
Figure 2:
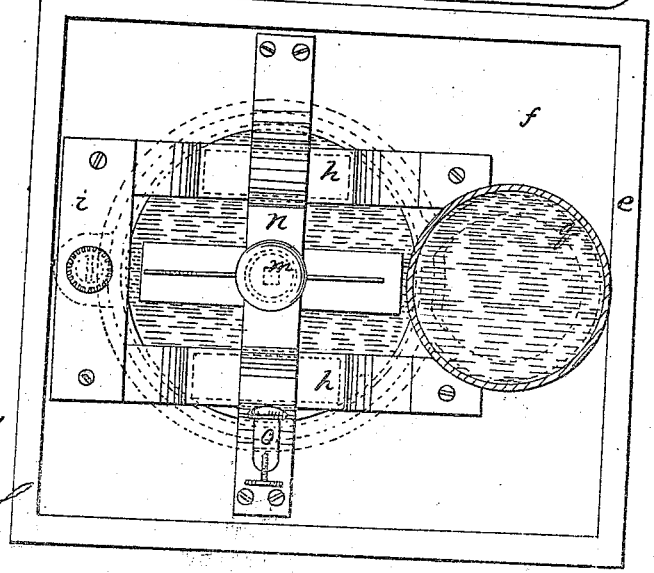

Figure 1 is a central section of this invention.
Figure 2 is a plan or top view thereof.
Similar letters indicate corresponding parts.

This invention relates to certain improvements in electric batteries, and consists in arranging the elements of the battery in such a manner as to obtain a force of great energy, and to have a continuous electric current.

Further, this new arrangement presents the advantage of being the means by which the zinc may be withdrawn from the action of the exciting liquid, when desired, the impoverished liquid dispelled and replaced by rich liquid, and, in consequence, the frequent recharging of the battery avoided.

My invention consists in means for renewing, automatically, the impoverished liquid, and for raising the zinc element out of the exciting liquid, to avoid its corrosive effects.

A stone, glass, porcelain, or any other suitable non-porous jar is used, divided, in the direction of its height, into two compartments, $a$ $b$, of unequal size, by a partition, $c$, composed of some similar material, in the lower part of which, at a short distance from the bottom of the jar, is an aperture, $d$, forming a communication between the two compartments.

This jar is placed in a frame or box, $e$, provided with a movable lid, with openings for the introduction of the elements, and of the pipe of the reservoir.

The two coal elements $g$ are suspended, immovably, one on each side of the metal element, from brackets, $h$, fixed on the cover $f$, and connected by the strip of metal $i$, which is provided with a stop-screw, to constitute one of the poles of the battery.

The zinc element, which can be as voluminous as is desired, to make the battery capable of acting for a long time, is fixed to the lower end of a rod, $m$, sliding perpendicularly in holes in a bracket, $n$, fixed on the cover like a bridge.

On one side of this bracket is placed a post, with stop-screw $o$, to constitute the second pole.

The zinc element can thus be inserted in or withdrawn from the exciting liquid more or less, by raising or lowering the rod, which is furnished, at intervals, with holes for this purpose, in which is passed a pin, $K$, which serves to maintain the element at the end of the rod freely suspended either in or over the exciting liquid. If the cells thus formed are united together to constitute a battery, the operation of raising and lowering the zinc could be effected simultaneously, by connecting all the rods $m$ by a rod whose ends could be raised or lowered in standards with rack and pinion, or otherwise.

The exciting liquid is poured into the two compartments $a$ $b$ of the jar, which is filled up to the discharging-pipe $p$, placed in the upper part of the large compartment $a$.

Above the smaller compartment $b$ is placed, upside down, a bottle or jar, $q$, containing exciting liquid in reserve. The mouth of this reservoir touches the surface of the liquid contained in the small compartment, and, in proportion as the liquid of the large compartment is used or evaporates, the quantity used or evaporated is replaced by an equal quantity of liquid from the smaller compartment, passing through the aperture $d$, which quantity is equally replaced in the small compartment by the reservoir.

To restore the impoverished liquid, it suffices to withdraw the zinc; the level in the two compartments is established in the manner that has been indicated; then, when the zinc is again immersed, the upper portion of the liquid in the large compartment, which is that impoverished, runs off through the discharging-pipe $p$, in a quantity equal to what displaced by the volume of the zinc.

The exciting liquid may be composed of bichromate of potash, bisulphate of mercury, and sulphuric acid, diluted with water.

The battery above described can be advantageously combined with that described in the specification annexed to the petition, filed simultaneously with this present case, to obtain Letters Patent for the same; for, the elements of this latter battery being placed under those of the one just described with two compartments and a discharge-pipe, the liquid displaced from this latter is still sufficiently energetic that, by soaking the sand and the coke of the other battery, an excitement is produced which suffices.

Having thus described the nature of the said improvements and the manner of carrying the same into effect, I would have it understood that I do not confine myself to the precise details herein indicated and represented in the drawing making part of this specification; but

What I claim as new, and desire to secure by Letters Patent, is—

1. The division, in electric batteries, of the jar or cell containing the exciting liquid, into two compartments, communicating with one another by an aperture near the bottom of the jar, as has been described and shown in the drawing.

2. The combination, in electric batteries, of a vessel containing exciting liquid in reserve, with the jar or cell in which is the liquid acting on the elements, and with the contrivances used for immersing or withdrawing the zinc from the exciting liquid, so as to operate or arrest the action of the battery, as desired, and to cause the impoverished portion of the liquid to flow off, as has been described, set forth, and shown.

T. CHUTAUX.

Witnesses:
N. BONNEVILLE,
A. NORTON,